July 3, 1928.
A. COHN
DAMPER
Filed May 4, 1927
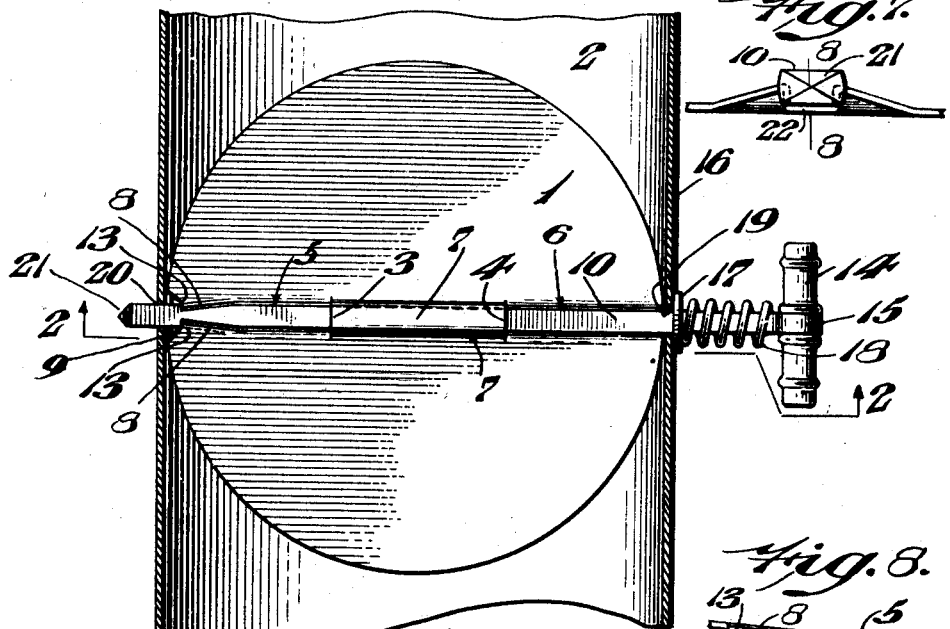
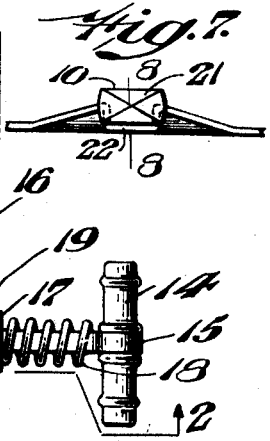
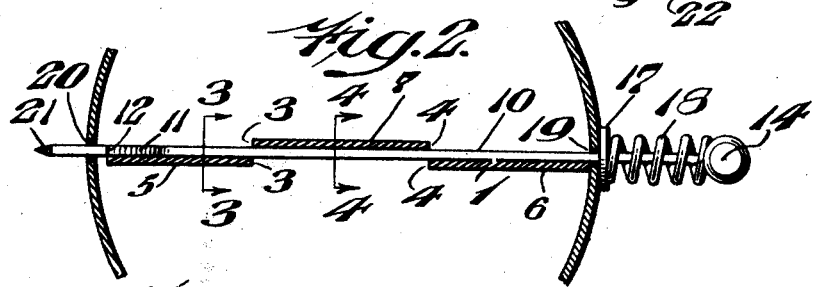
INVENTOR:
AARON COHN
BY
Leonard L. Kalish
ATTORNEY Patented July 3, 1928.

1,675,404

UNITED STATES PATENT OFFICE.

AARON COHN, OF PHILADELPHIA, PENNSYLVANIA.

DAMPER.

Application filed May 4, 1927. Serial No. 188,684.

My invention relates to a new and useful damper for use in connection with furnace flues, draft pipes or the like, and it relates more particularly to a novel construction in a damper of this character, characterized by extreme simplicity of construction, ease of mounting or application to the flue or pipe, a lower cost of manufacture and greater durability.

With the above ends in view, my invention consists of a damper plate, of any desired contour to fit the particular cross sectional shape of the flue or draft pipe for which it is adapted, said plate having suitable diametrically aligned and opposed, staggered, offset channels pressed thereinto, a relatively flat damper rod or spindle of generally rectangular cross section, disposed in said channels and interengaging and interlocking with the same, so as to prevent the relative rotation thereof with respect to the damper plate, said damper rod or spindle having a suitable tranverse handle secured to one end thereof and having suitable transverse locking notches at the other end thereof, adapted to interlock with corresponding locking shoulders on the damper plate, whereby said damper rod may be interlocked with the damper plate in such a manner as normally to prevent the withdrawal thereof, and so as to permit of a release of the damper rod from such locking engagement at will.

For the purpose of illustrating my invention, I have shown, in the accompanying drawings, a form thereof which is at present preferred by me, since it will give in practice, satisfactory and reliable results, although it is to be understood that the various instrumentalities of which my invention consists can be variously arranged and organized and that my invention is not limited to the precise arrangement and organization of the instrumentalities herein shown and described.

In the accompanying drawings, in which like reference characters indicate like parts, Fig. 1 represents a longitudinal section of a flue or draft pipe having the novel damper of my construction mounted therein and shown generally in plan view.

Fig. 2 represents a section on line 2—2 of Figure 1.

Fig. 3 represents a section on line 3—3 of Figure 2.

Fig. 4 represents a section on line 4—4 of Figure 2.

Fig. 5 represents a fragmentary plan view of the damper plate with the damper rod removed therefrom.

Fig. 6 represents a fragmentary plan view of one end of the damper rod of my novel construction.

Fig. 7 represents a fragmentary end view of the damper plate and rod on an enlarged scale.

Fig. 8 represents a fragmentary section on line 8—8 of Fig. 7.

In carrying out my invention, I provide a damper plate 1 of sheet metal of any suitable thickness, and of a peripheral contour corresponding to the cross-sectional shape of a flue pipe or draft pipe 2, for which it is adapted. In the particular illustration shown in the drawings, the pipe 2 is of a circular shape. The damper plate 1 is provided with a pair of transverse cuts 3 and 4, disposed along a diameter thereof, spaced approximately one third from the peripheral edges thereof. Suitable opposed and staggered channels 5, 6 and 7 are then pressed into the sheet metal of the damper plate 1, along a diameter thereof, said channels being aligned and extending between the peripheral edges of the plate 1 and the respective cuts 3 and 4 respectively, as shown particularly in Figures 1, 3 and 5. The channel 5 extending between said cut 3 and the periphery of the plate 1, is narrowed at its outer end as indicated in Figures 1 and 5, with two opposed and converging side walls 8. The periphery of the damper plate 1 is also suitably notched or recessed as at 9 in juxtaposition to the narrowed portion of the channel 5. The damper rod 10 of my novel construction comprises a relatively flat and substantially rectangular bar of any suitable dimensions to fit snugly in the corresponding channels 5, 6 and 7.

The free end of the damper rod 10 is also recessed or notched on both sides, as at 11, corresponding to the narrowed walls 8 of the channel 5, and provided with rearward shoulders 12, which are adapted to interengage and interlock with corresponding shoulder 13 of the damper plate 1. The opposed end of the damper rod carries a manually operable transverse handle 14, of a suitable material, suitably affixed thereto by encircling the same with a loop 15, formed of the rod. Between the handle 14 and the wall 16 of the flue or draft pipe 2, a washer 17 and a helical compression spring 18 are interposed, adapted to exert an outward axial tension upon the damper rod in operative and locking engagement with the shoulders 13 of the damper plate 1.

The damper of my novel construction is applied to the flue or draft pipe 2, by inserting the plate 1 in the pipe in juxtaposition to the two bearing apertures 19 and 20, after which the pointed end 21 of the damper rod 10 is inserted successively through the bearing 19, the channels 6, 7 and 5, of the damper plate 1, and finally projected into the bearing aperture 20. As the damper rod 10 is forced further into the flue pipe the end of the damper rod is deflected and thus raised above and clear of the constricted part 8 of the channel in the damper plate, until the shoulders 12 of the pointed head 21 of the rod snap into the recess 9, and there interlock with the shoulders 13, due to the tension of the spring 18. To withdraw the damper rod for the purpose of removing the damper it is merely necessary to disengage the locking shoulders 12, and then to withdraw the rod bodily. By slightly raising the end of the channel 5, as at 22, the locking action between the shoulders 12 and 13 on the damper rod 10 and the plate 1 respectively is greatly increased.

It will now be apparent that I have devised a new and useful construction of a damper which embodies the features of advantage enumerated as desirable in the statement of the invention and the above description, and while I have in the present instance shown and described a preferred embodiment thereof, which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent is:

In a device of the character stated, a damper plate having opposed and alternately staggered and longitudinally aligned channels of substantially rectangular cross section extending across the same, a damper rod of generally rectangular cross-section adapted to be inserted into said channels and interlock with the same so as normally to prevent relative rotation thereof with respect to the plate, a handle carried by one end of said damper rod, said damper rod having near its other end a pair of notches and resultant rearward locking shoulders, corresponding constrictions and resultant shoulders in one of said channels adapted to interlock and engage with the corresponding shoulders on said damper rod, and a spring intermediate said handle and said damper plate for maintaining a constant axial tension on the damper rod, and thereby normally to maintain said rod in locking engagement with said damper plate.

In witness whereof I have hereunto set my hand and seal.

AARON COHN.